United States Patent [19]
Takei et al.

[11] 3,896,964
[45] July 29, 1975

[54] SAFETY FUEL TANK HAVING HIGH SUCTION ABILITY

[75] Inventors: Atsuo Takei, Fujisawa; Isao Nagaoka; Shozo Tsunoda, both of Yokohama, all of Japan

[73] Assignee: Bridgestone Tire Company Limited, Tokyo, Japan

[22] Filed: Nov. 7, 1973

[21] Appl. No.: 413,741

[30] Foreign Application Priority Data
Nov. 16, 1972 Japan............................ 47-131102

[52] U.S. Cl.............. 220/88 R; 220/85 R; 280/5 A; 220/DIG. 6
[51] Int. Cl...................... B65d 25/14; B65d 25/34
[58] Field of Search ...... 220/5 A, 85 R, 85 F, 86 R, 220/88 R, DIG. 6; 280/5 H, 5 A

[56] References Cited
UNITED STATES PATENTS
| 1,792,827 | 2/1931 | Farkas | 220/DIG. 6 |
| 2,180,185 | 11/1939 | Weiss | 220/85 R |
| 3,277,812 | 10/1966 | Behlen | 220/88 R |
| 3,561,639 | 2/1971 | Allen | 220/88 R |
| 3,708,330 | 2/1973 | Harr | 220/88 R |

Primary Examiner—George E. Lowrance
Attorney, Agent, or Firm—Sughrue, Rothwell, Mion, Zinn & Macpeak

[57] ABSTRACT

A safety fuel tank having high suction ability comprises a tank body, a foamed body having open-cells and being filled in said tank body, a suction pipe extending vertically through the foamed body and terminating at the bottom of the tank body and a collector tank projected downward from the bottom of the tank body. Said collector tank extends across the width of the tank body.

2 Claims, 2 Drawing Figures

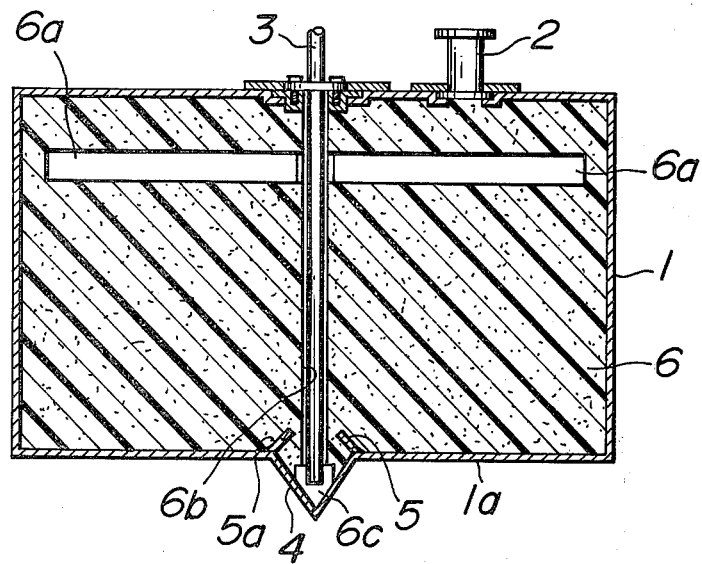
FIG_1
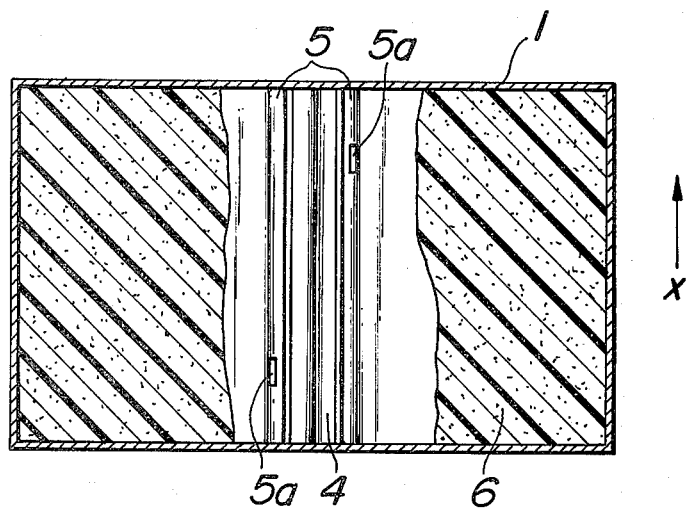
FIG_2

SAFETY FUEL TANK HAVING HIGH SUCTION ABILITY

BACKGROUND OF THE INVENTION

1. Field of the Invention

The present invention relates to an improvement of the fuel suction ability of a safety fuel tank of a type in which a foamed body having open-cells is filled within the tank body.

2. Description of the Prior Art

There has been a safety fuel tank filled with a foamed body having open-cells in order to prevent the fuel from rocking and unbalancing in the tank during running and accelerating of a vehicle and also to prevent the fuel from scattering and flushing instantaneously out of the tank when the tank is broken down by a collision with another vehicle or the other.

However, such a safety tank has a disadvantage that when the fuel is sucked from the tank it is impossible to sucked out the all of the fuel under the normal running condition since a part of the fuel is caught by the cells of the foamed body and the flow of the fuel is retarded in roundabout passages formed by the cells of the foamed body so that a part of the fuel is remained in the tank. The above disadvantage is an important problem for such a safety fuel tank which is frequently mounted on a vehicle for using in an auto race since the number of times of fuel supply during an auto race is increased and resulted in substantial time loss. For example, in a conventional safety fuel tank which can be sucked out amount of 80 ls of fuel under a stational condition, only 75 ls of fuel can be sucked out under a running condition and the remaining fuel of about 5 ls is adhere to the foamed body in the tank or becomes a residuum on the bottom of the tank.

SUMMARY OF THE INVENTION

The invention is intended to remove the above disadvantage and for its purpose the safety fuel tank comprises a tank body, a foamed body having open-cells and being filled in said tank body, a suction pipe extending vertically through said foamed body and terminating at the bottom of the tank body and a collector tank projected downward from the bottom of the tank body, said collector tank being extended across the width of the tank body and defined at the lower portion thereof a space for opening the lower end of said suction pipe.

An object of the present invention is to provide a safety fuel tank having a foamed body filled therein and still having high suction ability.

The invention will now be described in connection with the accompanying drawings.

BRIEF DESCRIPTION OF THE DRAWING

FIG. 1 is a vertical sectional view showing an embodiment of the safety fuel tank according to the invention; and FIG. 2 is a cross sectional view, partly broken away, showing the bottom portion of the fuel tank shown in FIG. 1.

DESCRIPTION OF THE PREFERRED EMBODIMENT

Referring to the drawings, there is indicated at 1 a fuel tank body made of laminated material such as a canvas coated with urethane elastomer, metal material or the other. The tank body 1 is provided with mountings such as a fuel inlet piece 2 and a fuel suction pipe 3.

At the bottom of the tank body 1, there is provided a collector tank 4 projected downward from the bottom. The collector tank 4 shown in the drawings is in the shape of a triangular prism extending in a direction $x$ of advance of the vehicle and is formed integrally with the tank body 1, but the shape of the collector tank is not limited to the embodiment shown in the drawings and may be formed in different shape so as to provide a collector tank projected downward from the bottom of the tank body. Of course, the collector tank 4 may be separately formed and connected to the bottom opening formed in the tank body 1. The collector tank 4 may be provided at the opposite upper edges thereof, that is the bottom 1a of the tank body 1 with baffle plates 5 having passages 5a for flowing fuel along the bottom of the tank body 1 into the collector tank 4. The baffle plates 5 shown in the drawings are inclined upwardly and inwardly from the upper edges of the collector tank 4 so as to enclose the upper portion of the collector tank.

The tank body 1 is filled therein with a foamed body 6 having open-cells such as polyurethane foam or the like and the foamed body is provided with a vertical hole 6b for inserting the suction pipe 3 and a horizontal hole 6a for improving flow of the fuel.

The foamed body 6 may be filled in the tank body in different ways, but when the tank body 1 is made of a canvas coated with urethane elastomer, it is preferable that a foamed body 6 is divided into a plurality of blocks having desired shape, then urethane elastomer is applied on each of the blocks and the canvas is adhered to the blocks so as to form the wall of tank body.

The fuel tank 4 may be partly filled with the foamed body except the lower portion thereof so as to leave a suction space 6c in which the suction pipe is opened at the bottom opening thereof.

It will be apparent from the foregoing that the safety fuel tank according to the invention, the fuel in the tank is normally and continuously supplied to an engine until substantially all of the fuel is sucked out of the fuel tank, even if fuel remaining in the tank is decreased, since the fuel is effectively collected in the collector tank by vibration during the running of vehicle and the collected fuel can not back into the tank body 1.

A vehicle provided with the safety fuel tank according to the invention proves in running tests on a test road that the normal running condition is maintained until substantially all of the fuel in the tank is sucked out.

What is claimed is:

1. A safety fuel tank comprising, (a) a tank body, (b) a foamed body having open-cells disposed in said tank body; (c) a collector tank projecting downwardly from the bottom of the tank body, said collector tank extending across the width of tank body, and communicating with the interior of said tank body so as to allow fuel to collect in said collector tank, (d) a suction pipe extending vertically through said foamed body and terminating in said collector tank, and (e) a baffle plate secured to each joint between the tank body and collector tank, said baffle plates inclined upwardly and extending into said tank body and having passages therethrough for passing fuel along the bottom of the tank body into said collector tank.

2. The safety fuel tank claimed in claim 1, wherein said foamed body extends into an upper portion of said collector tank and leaves an open lower space for sucking the fuel collected therein.

* * * * *